United States Patent [19]

Bedrij et al.

[11] Patent Number: 4,794,386

[45] Date of Patent: Dec. 27, 1988

[54] DATA INTEGRATOR FOR VIDEO DISPLAY INCLUDING WINDOWS

[75] Inventors: Orest J. Bedrij, Poughkeepsie; Orest W. Bedrij; Alan L. Rogers, both of New York, all of N.Y.

[73] Assignee: Profit Technology, Inc., New York, N.Y.

[21] Appl. No.: 850,724

[22] Filed: Apr. 11, 1986

[51] Int. Cl.[4] .......... G06F 3/14; G09G 1/16

[52] U.S. Cl. .......... 340/724; 340/703; 340/726; 364/518; 364/521

[58] Field of Search .......... 340/726, 724, 703; 358/288; 364/518, 521

[56] References Cited

U.S. PATENT DOCUMENTS

| | | | |
|---|---|---|---|
| 4,412,294 | 10/1983 | Watts et al. | 340/726 |
| 4,413,314 | 11/1983 | Slater et al. | 364/188 |
| 4,437,093 | 3/1984 | Bradley | 340/726 |
| 4,451,895 | 5/1984 | Sliwkowski | 364/521 |
| 4,586,035 | 4/1986 | Baker et al. | 370/712 |
| 4,642,790 | 2/1987 | Minshull et al. | 340/726 |
| 4,663,617 | 5/1987 | Stockwell | 340/726 |

*Primary Examiner*—Howard A. Birmiel
*Attorney, Agent, or Firm*—Leydig, Voit & Mayer

[57] ABSTRACT

A computer-controlled video display presents alphanumeric or graphic data to a human user in a fashion selected to provide user control of the data transfer rate and to increase mental concentration, comprehension and creativity. A set of video display regions or windows are defined having selected positions and areas for presenting data obtained from one or more registers or buffers. Associated with each display window is a set of stored parameters controlling the display of data in the window. The control parameters include parameters designating the size and location of each window, foreground and background colors and display intensity or pulsation, and the source of the data to be displayed. Other control parameters are associated with the specific data source registers as well as specific display areas, such as the time interval over which the data are to be displayed, the time interval over which the window is to disappear after data are displayed, whether data are to be displayed on a repetitive, sequential or random basis, and selection of a scrolling rate. The control parameters are user-adjustable. Preferably the data from the registers are transferred to the display on a timed interrupt basis so that the display system can be used during the execution of a related or unrelated interactive computer program.

45 Claims, 4 Drawing Sheets

WINDOW CONTROL PARAMETER ARRAYS 24

| | |
|---|---|
| WACT | ACTIVE/INACTIVE |
| Z, L, W | WINDOW LOCATION & SIZE |
| FC, BC | FOREGROUND & BACKGROUND COLOR |
| PULSE, INTEN | WINDOW PULSATION & INTENSITY |
| ONINT, OFFINT | WINDOW ON & OFF INTERVALS |
| ONFLG | WINDOW ON FLAG |
| TON, TOFF | TIME WHEN WINDOW WAS LAST TURNED ON/OFF |
| STSC | INTERVAL BEFORE SCROLLING |
| SINT | SCROLL INTERVAL |
| TSCR | TIME WHEN WINDOW WAS LAST SCROLLED |
| WCP | WINDOW CHARACTER POINTER |
| RCP | RAM CHARACTER POINTER |
| REG | REGISTER SELECTION LIST POINTER |
| REGLIST | LIST OF REGISTERS TO DISPLAY |
| NREG | NO. OF REGISTERS IN LIST OF REGISTERS |
| RDMFLG | RANDOM REGISTER SELECTION FLAG |

FIG. 3

REGISTER CONTROL PARAMETER ARRAYS 25

| | |
|---|---|
| REGADR | REGISTER RAM STARTING ADDRESS |
| NCREG | NO. OF CHARACTERS IN REGISTER |
| REGACT | ACTIVE/INACTIVE |
| EXTINT | EXTENDED TIME FOR DISPLAYING REGISTER |
| SCRFLG | DISPLAY BY SCROLLING |
| ALLFLG | SCROLL THROUGH ENTIRE REGISTER |

FIG. 4

DATA INTEGRATOR FOR VIDEO DISPLAY INCLUDING WINDOWS

BACKGROUND OF THE INVENTION

1. Technical Field

The present invention generally relates to computer terminals, and more specifically concerns computer-controlled video displays and systems for using these video displays for creativity, education, thought triggering, problem solving, new idea generation, speed reading and speed learning.

2. Description of the Related Art

The conventional method of using a computercontrolled video display for the presentation of alphanumeric data is by sequentially displaying the individual characters, lines of characters, or pages of characters.

Individual characters are sequentially presented to the user when the characters become available at a rate that is relativeyy slow compared to the response time of the human visual system. This response time is on the order of about 20 milliseconds. Therefore, it is customary for individual characters to be sequentially displayed as they are manually typed as input from a keyboard or as they are received from a serial data link operated at data rates of about 300 baud or less.

Characters are typically displayed on a line-by-line basis during a "scrolling" operation. After a full page of alphanumeric data has been received and displayed, for example on a character-by-character basis, the first line on the page containing the first presented data is nearly instantaneously changed to display the data previously displayed in the second line on the page, the second line is nearly instantaneously changed to display the data previously displayed in the third line on the page, and so on, so that the data displayed on the last line on the page is cleared to receive new characters or replaced with a new line of data. Therefore, during the scrolling operation all of the displayed data very quickly jumps up (or down) by one line. It is customary to inhibit scrolling until a control key is activated, in which case all of the data scrolls by one line each time the control key is activated. The scrolling operation is typically used in word processing programs during the display and editing of multi-page documents.

Data are typically displayed on a page-by-page basis during the display of a multi-page document or during the use of "menu driven" software. In menu driven software, a page or menu of selections is displayed to the user, and in response to a selection signal from the user, the next page of data is chosen from a group of predetermined pages of data, some of wiich may contain different menus for further selections.

It is known to divide the screen of a video display into separate regions for displaying respective groups of data. One part of a display, for example, has been used to show interactive dialog between the user and a data base management system, and the other part of the display has been used for showing records retrieved by the data base management system.

SUMMARY OF THE INVENTION

The primary object of the invention is to facilitate the process of maximum data integration by the mind of a human user.

A more specific object of the invention is to provide a convenient means for user control of the rate at which alphanumeric or graphic data are transferred from the video display to the mind of the human user, without substantial interference with the data transfer process.

Another object of the invention is to provide a convenient means for reinforcing the presentation of selected alphanumeric data or images to a human user and triggering pre-established thought patterns in response to the alphanumeric data or images.

Still another object of the invention is to provide a means for increasing the maximum rate at which alphanumeric data can be transferred from a video display to the mind of a human user without substantial loss of mental concentration or comprehension.

Moreover, another object of the invention is to provide a means for using normally "wasted" time during which the user of an interactive computer system waits for the system to respond to a service request.

Briefly, in accordance with important aspects of the present invention, a computer-controlled video display presents alphanumeric or graphic data to a human user in a fashion selected to provide user control of the data transfer rate and to increase mental concentration and comprehension. A set of video display regions or windows are defined having selected positions and areas for presenting data obtained from one or more registers or buffers. Associated with each display window is a set of stored parameters controlling the display of data in the window. The control parameters include, for example, parameters designating the size and location of each window, foreground and background colors and display intensity or pulsation, and the source of the data to be displayed. Other control parameters can be associated with the specific data source registers as well as specific display areas, such as the time interval over which the data are to be displayed, the time interval over which the window is to disappear after data are displayed, whether data are to be displayed on a repetitive, sequential or random basis, and selection of a scrolling rate. Preferably the control parameters are user-adjustable in a convenient fashion such a by entry from a mouse, by color palette selection, and by increasing or decreasing the timing control parameters.

To display data from selected registers during the execution of a related or unrelated computer program, it is advantageous to repetitively execute a separate control procedure for transferring data from the registers to the windows. Preferably this separate control procedure is executed on a timed interrupt basis and references an array of control parameters associated with the respective windows and an array of control parameters associated with the respective registers. The computer program may then exercise supervisory control by modification of the control parameters in the arrays. The control parameters, for example, include logical flags for enabling the display of data in the windows, and an interactive computer program may obtain exclusive use of the display by clearing the flags. By setting the flags when the user enters a service request to the interactive computer program, and clearing the flags when the interactive computer program has formulated a response to be displayed to the user, the time normally wasted during the execution of the interactive computer program can be used for displaying data in the windows. The display of subliminal messages in the windows, however, need not be inhibited when the interactive computer program is using the display.

BRIEF DESCRIPTION OF THE DRAWINGS

Other objects of the invention will become apparent upon reading the following detailed description and upon reference to the drawings, in which:

FIG. 3 is a listing of control parameter arrays associated with the windows on the screen of the video display of FIG. 1;

FIG. 4 is a listing of the control parameter arrays associated with the memory registers shown in FIG. 1;

Figure 1:
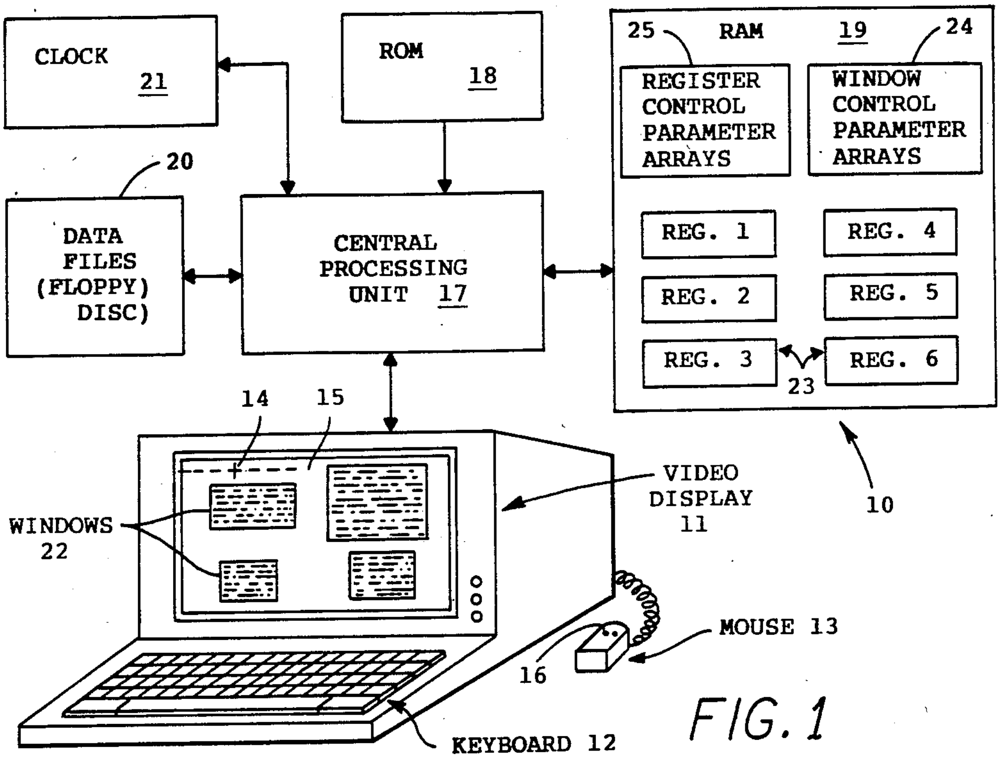
FIG. 1 is a schematic diagram of a computercontrolled video display terminal using the present invention and having a number of windows for displaying the contents of selected memory registers.

The control procedure for the video display terminal of FIG. 1 is further shown in the computer code listings in Appendices II–VI.

While the invention is susceptible to various modifications and alternative forms, a specific embodiment thereof has been shown by way of example in the drawings, and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

DESCRIPTION OF THE PREFERRED EMBODIMENTS

Turning now to FIG. 1, there is shown a schematic diagram of a computer-controlled video display terminal generally designated 10 employing the present invention. The terminal includes a video display 11 for displaying alphanumeric or graphic characters to a user (not shown), and a keyboard 12 for permitting the user to enter commands and data. The terminal 10 may include other means for permitting the user to enter data, such as a mouse 13. As is well known, the user may enter coordinate data with respect to the video display 11 by movement of the mouse 13 over a flat surface. Movement of the mouse 13 is reflected by movement of a cursor 14 until the cursor reaches a selected point on the display screen 15. The coordinates of the selected point are entered when the user activates a push button switch 16 on the mouse 13.

For controlling the operation of the video display 11 in response to commands or data entered from the keyboard 12 or the mouse 13, the video display terminal 11 includes a central processing unit 17 of the kind of which executes a control procedure comprising instructions fetched from addressable memory. As is conventional, the addressable memory includes read only memory (ROM) 18, and random access memory (RAM) 19. The ROM includes basic control steps for receiving data from the keyboard 12 and for transmitting instructions to the video display 11.

Depending on the particular application, the video display 11 is used as a remote terminal to another central processing unit (not shown) or on a stand-alone basis using the central processing unit 17 for executing a selected computer program. As shown in FIG. 1, the central processing unit 17 may execute a prestored computer program obtained from one of many data files 20. The data files, for example, are stored on a floppy disk. The ROM 18, for example, includes control steps executed in response to a command from the keyboard 12 in order to read a selected program from the data files 20, load the program into RAM 19, and to execute the program.

To permit the execution of programmed instructions at predetermined times, the computer-controlled video display terminal 10 preferably includes a clock 21, and the read only memory 18 includes a subroutine for obtaining the time indicated by the clock 21. The time is indicated, for example, by a number which is periodically incremented at intervals of 1 or more milliseconds. This number could be read directly by the central processing unit 17 from the clock 21, or it could be obtained from a random access memory location which is periodically incremented in response to a periodic interrupt of the central processing unit 17 by the clock 21. Although the use of a clock 21 for keeping track of timing intervals and for providing interrupts is not essential for practicing the present invention, it does simplify the programming of the video terminal 10.

For carrying out the present invention, the video display 11 is of the kind which has means for displaying selected alphanumeric or graphic characters at selected coordinates on the display screen 15 in response to instructions executed by the central processing unit 17. The graphic characters, for example, include blanks and dots, or more complex shapes formed as a matrix of dots.

A preferred kind of video display is a raster-scanned color cathode ray tube display. This kind of video display typically has a scanned memory for storing character codes, at least one memory location being provided for each row and column character postion on the display screen 15. The memory location stores a code number for specifying the character to be displayed, and may also include attributes associated with the display of that character. These attributes include, for example, the foreground and background color, intensity and pulsation of the displayed character. The scanned memory is addressed by raster scanning circuits which sequentially deflect the electron beam in the cathode ray tube along a path including the addressed character positions. Therefore, by addressing the character codes and attributes in synchronism with the scanning of electron beam, the information about each character to be displayed is obtained at the proper times to modulate the electron beam in the cathode ray tube.

As described above, the video display terminal 10 is recognized as having conventional components which may be used for a number of different purposes depending on the control procedures stored in the ROM 18 or read from the data files 20 into the RAM 19. The video display terminal 10, for example, could function as a master or slave terminal for a remote computer, or it could function as a stand-alone "personal" computer or be programmed for a specific application such as word processing or data-base management. The display terminal 10 is readily available in a variety of forms from numerous manufacturers in both the original equipment and the consumer markets.

In accordance with important aspects of the present invention, the computer-controlled video display terminal 10 presents alphanumeric or graphic data to a human user in a fashion selected to facilitate control of the data transfer rate and to increase mental concentration and comprehension. A set of video display regions or windows 22 are defined having selected positions and areas for presenting data obtained from one or more memory buffers or registers 23. Associated with each window 22 is a set of stored parameters for controlling the display of data in the window. As shown in FIG. 1, the stored parameters associated with each window are preferably stored as arrays 24 in the random access memory 19. The control parameters include, for example, parameters defining the windows 22 on the display screen 15, a subset of the registers 23 for display in each of the respective windows, and timing information for controlling how long the same alphanumeric characters are to be displayed in each window. The control parameters defining the respective windows 22 on the display screen 15 include, for example, parameters designating the size and location of each window, the foreground color and the background color for each window, and the display intensity or pulsation of the characters displayed in each window.

Preferably during the display of data, the control information associated with each window is modified to some degree by control information associated with the selected register. Preferably the control information associated with the registers is stored in arrays 25 in the random access memory 15. Therefore, the control information for displaying the data in each window is obtained by reading the register control parameter arrays 25 for the selected register, reading the window control parameter arrays 24 for control information for the window, and combining the register control information with the window control information.

In accordance with another important aspect of the present invention, the central processing unit 17 executes a control procedure to display the alphanumeric or graphic characters in the windows 22 by reading the control parameters defining the subset of registers for display in each of the windows, selecting a particular register in the subset of the registers for each of the windows, reading the control parameters defining the respective windows, and in response to the control parameters defining the respective windows, transferring at least some of the codes for alphanumeric or graphic characters stored in the selected register for each window to the video display 11 so that corresponding characters are selectively displayed at each window. Also the central processing unit 17 reads the control parameters specifying timing information, and in response to the timing information, selectively terminates the display of the characters displayed at each windww. These steps are repetitively performed so that alphanumeric or graphic data from a number of different registers are displayed in each window.

Figure 2:
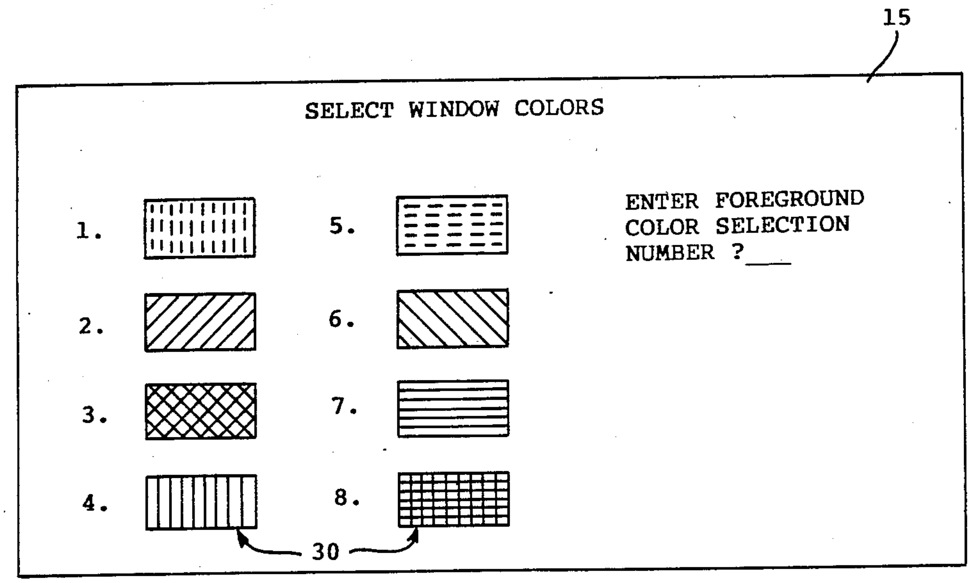
FIG. 2 is a pictorial representation of the screen of the video display when used for selecting foreground colors.

In accordance with another aspect of the present invention, the control parameters are selected by the user either before or during the display of characters in the windows. Preferably the user selects the foreground and background colors before the windows are displayed. As shown in FIG. 2, this is conveniently done by displaying a palette of colors generally designated 30 on the screen 15.

In order to illustrate the various ways of controlling the display of characters from selected registers in user-defined windows, a specific example of window control parameter arrays and register control parameter arrays are shown in FIGS. 3 and 4. So that the user may interactively run any computer program from the terminal 10 while characters from the registers 23 are displayed in the windows 22 without interference with the running of the computer program, the transfer of the character codes from the registers to the video display 11 is performed by a separate interrupt procedure. The control parameter arrays 24, 25 are preferably global arrays. Then, the interrupted computer program can directly modify the display of data in the windows by changing the values of selected control parameters. Moreover, the interrupted computer program can determine the state of the video display 11 by inspection of the values in the control parameter arrays 24, 25. Preferably the control procedure for transferring the character codes from the registers 23 to the video display 11 is performed by a periodic interrupt signal generated by the clock 21 in FIG. 1.

For inhibiting the display of characters in a selected window, however, an active/inactive logical flag (WACT) is provided. Therefore, the interrupted computer program may entirely disable the display of characters in the windows by clearing all of the active/inactive flags (WACT) for all of the windows. This can be done, for example, to enable the display of characters in the windows 22 when the user interactively operating the interrupted computer program sends a service request to the computer program and is waiting for the computer program to respond. Just before responding, however, the computer program clears the active/inactive flag (WACT) for all of the windows to inhibit the display of characters in the windows and thereby obtains access to the entire screen 15 for responding to the user. In this fashion, the normally wasted time during the interactive execution of a computer program is used for related or entirely unrelated activities. If the user is a physician running a medical diagnostic program, for example, during the normally wasted time the physician may wish to review current topics of interest in his chosen specialty. Each register, for example, could store messages related to a respective topic. In a similar fashion, a lawyer interactively executing a legal search program could use the normally wasted time to view recent decisions by courts of law regarding his field of specialty.

Although in many cases it is desirable to inhibit the display of the windows 22 when an unrelated computer program is also using the video display 11, it is possible to display subliminal messages for relatively short periods of time which are not recognized by the conscious mind but which nevertheless enter the subconscious mind. Subliminal messages, for example, are useful for improving one's motivation, character or self-esteem, and for reinforcing or triggering preestablished thought patterns. Shown in APPENDIX I, for example, are sample messages related to improving one's courage.

The display of characters in the windows 22 also can be performed during the execution of an interrupted computer program so as to aid the user in running the interrupted computer program. A word processing program, for example, could include a dictionary of synonyms arranged in the form of registers, one register being provided for each word in the dictionary. Each time that a word is entered from the keyboard 12 or indicated by the cursor 14, for example, the register corresponding to that word is displayed in a window so that the user may possibly find a better word to use in the context of his or her composition. For translating or learning a foreign language, the registers could include various conjugations or declensions of verbs and nouns, as well as synonyms or rules of usage.

The register for display in a first window can also be selected in response to the contents of the register being displayed in a second window. In such a pointer or table look-up mode, for example, the user loads a set of registers with words to be repetitively displayed in the second window, and the word being displayed in the second window is used as an index or key to find corresponding synonyms or foreign language equivalents which are displayed simultaneously in the second window.

The window control parameter arrays are provided for specifying the location (Z) and the size (L, W) of each window. Preferably the user may select and modify the window location and size by entering screen coordinates, either from the keyboard 12 or by operating the mouse 13 shown in FIG. 1.

Window control parameter arrays (FC, BC) are provided for specifying the foreground and background colors associated with each window 22. The foreground color is the color of the non-blank characters displayed in the window. The background color is the color of blank characters as well as the color surrounding each non-blank character. As noted above, the foreground and background colors are attributes of each character. Control parameter arrays (PULSE, INTEN) are also provided for specifying the pulsation and intensity of the characters displayed in each window. The pulsation and intensity are also attributes of each character displayed by the video display 11.

It is desirable to control the time interval over which a message is displayed in a window depending upon the size of the window and depending upon the particular message. A larger window displaying a larger number of characters, for example, usually should have a longer display time than a smaller window displaying a smaller number of characters. A window control parameter array (ONFLG) is provided to specify the minimum time that a message is to be displayed in a particular window. Especially for displaying subliminal messages, it is desirable to provide a time interval during which each window completely disappears from the screen 15 so as to be less distracting to the conscious mind. For this purpose, a window control parameter array (OFFINT) is provided. Moreover, a logical flag (ONFLG) is provided to record whether each window is displaying characters or is absent from the display screen 15. To permit the central processing unit 17 to display the windows 22 for the specified on and off intervals, window control parameter arrays (TON, TOFF) are provided to record the time indicated by the clock 21 (see FIG. 1) when each window was last turned on and off, respectively.

In order to display the characters from a register 23 which stores the codes of more characters than can be displayed at a single time in a window, a control procedure is provided to transfer the character codes from the registers to the video display 11 in such a fashion as to cause scrolling of the characters displayed in the windows. During such a scrolling operation, preferably the window is first filled with characters and displayed for a certain time interval before scrolling, and then the characters are scrolled line-by-line in periodic fashion until the end of the register is reached, or until a maximum time limit for displaying the window or register has been exceeded. For controlling the timing of this scrolling operation, there are provided a window control parameter array (STSC) to specify the time interval before scrolling starts, an array (SINT) to specify the scrolling interval or period related to the scrolling rate, and an array (TSCR) specifying the clock time when the window was last scrolled by one line.

In a conventional video display terminal, the central processing unit transmits individual characters to the video display 11 and each character has associated wtth it an address on the screen 15. In order to transfer characters from the central processing unit 17 to selected windows, it is also convenient to identify each character as having a particular position in each window. For this purpose, a window control parameter array (WCP) is used to provide a window character pointer indicating the target position in a selected window for a selected character being transferred to the video display 11. It is also desirable to provide a corresponding character pointer to the random access memory location from which the character is being transferred. For this purpose, a window control parameter array (RCP) is provided.

The window control parameters also include parameters indicating how a register is to be selected for display in each window. Although registers can be selected in any number of ways, it is convenient to specify a list of registers which are permissible selections. A particular register is selected from the list, for example, either sequentially or randomly, or in response to a selection command received from the user. Therefore, to assist in register selection, the window control parameter arrays include an array (REG) including a list pointer for each window, a list of registers (REGLIST) for display for each window, and an array (NREG) indicating the number of registers in the list of registers for each window. It should be noted that the list of registers (REGLIST) is a two-dimensional array, while the other window control parameter arrays are one-dimensional arrays. A window control parameter array (RDMFLG) stores flags to indicate whether register selection for each window should be random, instead of sequential.

The register control parameter arrays 25 are shown in FIG. 4. An array (REGADR) includes the starting address in RAM for each register. The length of each register is indicated by an array (NCREG) storing the number of characters in each register.

During the display of the registers in the windows, it is sometimes desirable to inhibit the display of a particular register. For this purpose, an array (REGACT) is provided to store flags indicating whether each register is active and should be displayed. Alternatively, the display of a register in a selected window can be inhibited by removing the register from the list (REGLIST) of registers to display in each window.

As was noted above, the minimum time for displaying a register usually is related to the size of the window. Conversely, the maximum time for displaying a register in a window should be related to the length of the register. For this purpose, an array (EXTINT) is provided to specify an extended time for displaying a register. In other words, the time for displaying a selected register in a particular window is obtained by adding the minimum time (ONINT) to the extended time (EXTINT).

Scrolling is one method of displaying a selected register in a particular window when the entire register cannot be displayed in the window at one time. For certain applications, however, it may be desirable to scroll a register in a window even though the entire register can be displayed in a window at one time. This could be useful, for example, to prevent a reader from backtracking through a displayed message. Therefore, it is desirable to provide flag (SCRFLG) to explicitly indicate that a register should be displayed by scrolling. Also, since the scrolling rate is adjustable, it is desirable to provide a flag (ALLFLG) to specify that a window should be displayed for so long as is necessary to scroll through the entire register.

Figure 5:
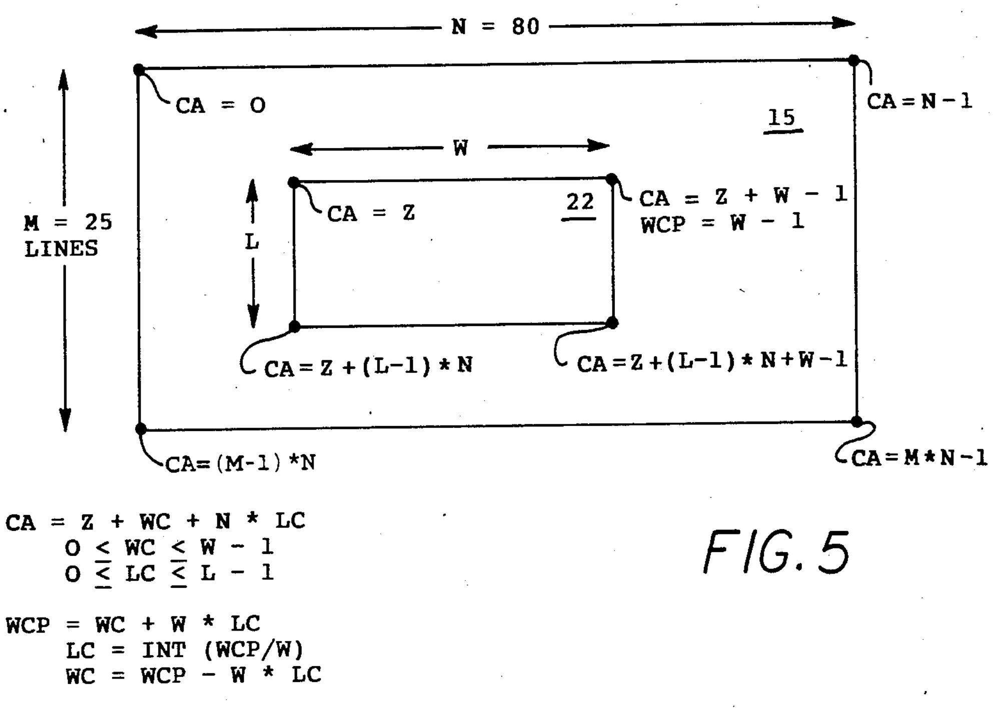
FIG. 5 is a diagram showing the transformation of window coordinates to screen coordinates of the video display of FIG. 1.

The scrolling of a message in a window as well as the initial loading of the message is performed by transferring character codes from the registers in RAM to the video display 11. So that the transferred characters are placed in a selected window of a selected size at a selected position on the display 15, a certain transformation is performed between the RAM address specified by the RAM character pointer (RCP) and a screen address (CA) indicating the position that the character is to assume on the screen 15. As shown in FIG. 5, a typical display screen 15 includes twenty-five lines by eighty rows of characters. The character position in the upper left-hand corner has a character address (CA) of zero, and the character position in the lower right-hand corner has a character address (CA) of 1999. So that the present specification will be applicable to a display screen having any nmmber of lines and columns of characters, the number of lines of characters will be indicated by the integer variable M, and the number of columns of characters will be indicated by the integer variable N. Therefore, it is apparent that in any case the character address (CA) of the upper left-hand character position is zero, and the character address (CA) of the character position in the lower right-hand corner is given by the expression $M * N-1$.

As shown in FIG. 5, the position of a window 22 is specified by the character address Z of the upper left-hand character position in the window, the length of the window is indicated by the number L of lines of characters in the window, and the width of the window is indicated by the number W of columns of characters in the window. Therefore, the character address (CA) of the upper left-hand character position in the window 22 has a value of Z, and the lower right hand character position in the window 22 has a value of $Z+(L-1) * N+W-1$.

During the transfer of characters from a selected register to the window 22, the RAM addresses of the characters will correspond sequentially to character positions within the window 22, but will not correspond sequentially to character positions within the sceeen 15. The RAM character address will correspond sequentially to a window character pointer WCP defined as equal to the value of a width coordinate WC within the window plus the product of the width W and a length coordinate LC of the character within the window. The character address on the screen, however, is equal to the sum of the window position Z and the width coordinate WC and the product of the screen width N and the line coordinate LC within the window. Therefore, when transferring characters from a register to the window 22, the window character pointer WCP is iteratively incremented by one for each character, the length and width coordinates LC and WC are computed from the value of the window character pointer WCP, and then the character address CA is computed from the values of the length coordinate LC and the width coordinate LC.

Now that the desired operation of the video display terminal 10 has been described in terms of the functions to be performed and the specific parameters for controlling these functions, a specific embodiment of the control procedure will be described. The control procedure includes an executive program portion for initializing the control parameters, and a periodic interrupt routine for repetitively updating the display windows.

Figure 6:
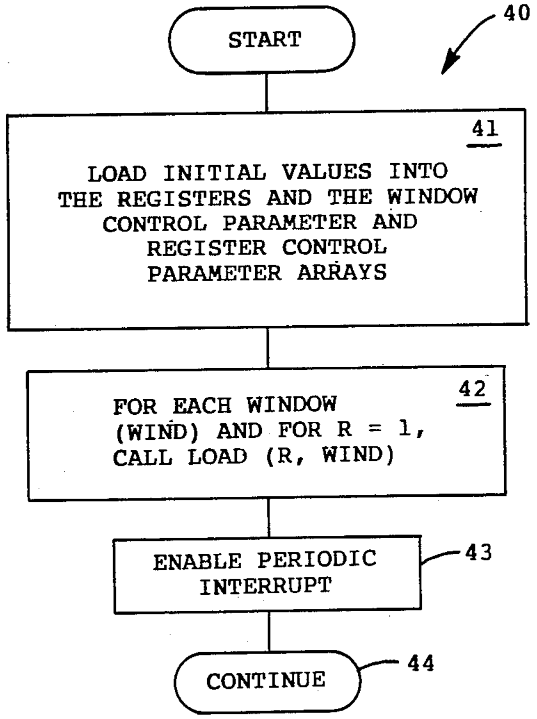
FIG. 6 is a flowchart of an executive control procedure for initially displaying the contents of selected registers in the windows on the video display of FIG. 1.

A flowchart of the executive program generally designated 40 is shown in FIG. 6. In the first step 41, initial values are loaded into the registers 23 and into the window control parameter arrays 24 and the register control parameter arrays 25. The initial values, for example, are obtained from the data files (20 in FIG. 1). In step 41, the user is also given the option of loading initial values, for example by selecting the window colors as described above in connection with FIG. 2, or by entering the coordinates of the windows using the mouse 13 shown in FIG. 1, or by directly setting the values of the control parameters by entering numerical values from the keyboard 12.

Returning to FIG. 6, the next step 42 in the executive program 40 is to call a subroutine named LOAD for initially loading each window with alphanumeric or graphic characters from a selected register. The first selected register, for example, is the first register in the list of registers (REGLIST). As described further below, the first register is loaded by calling the subroutine LOAD for a register index (R) equal to a value of one. After the loading step 42, a periodic interrupt is enabled in step 43 for executing the interrupt procedure described below in connection with FIG. 7. Then execution continues in step 44 with an interactive program between the user and the central processing unit 17.

Figure 7:
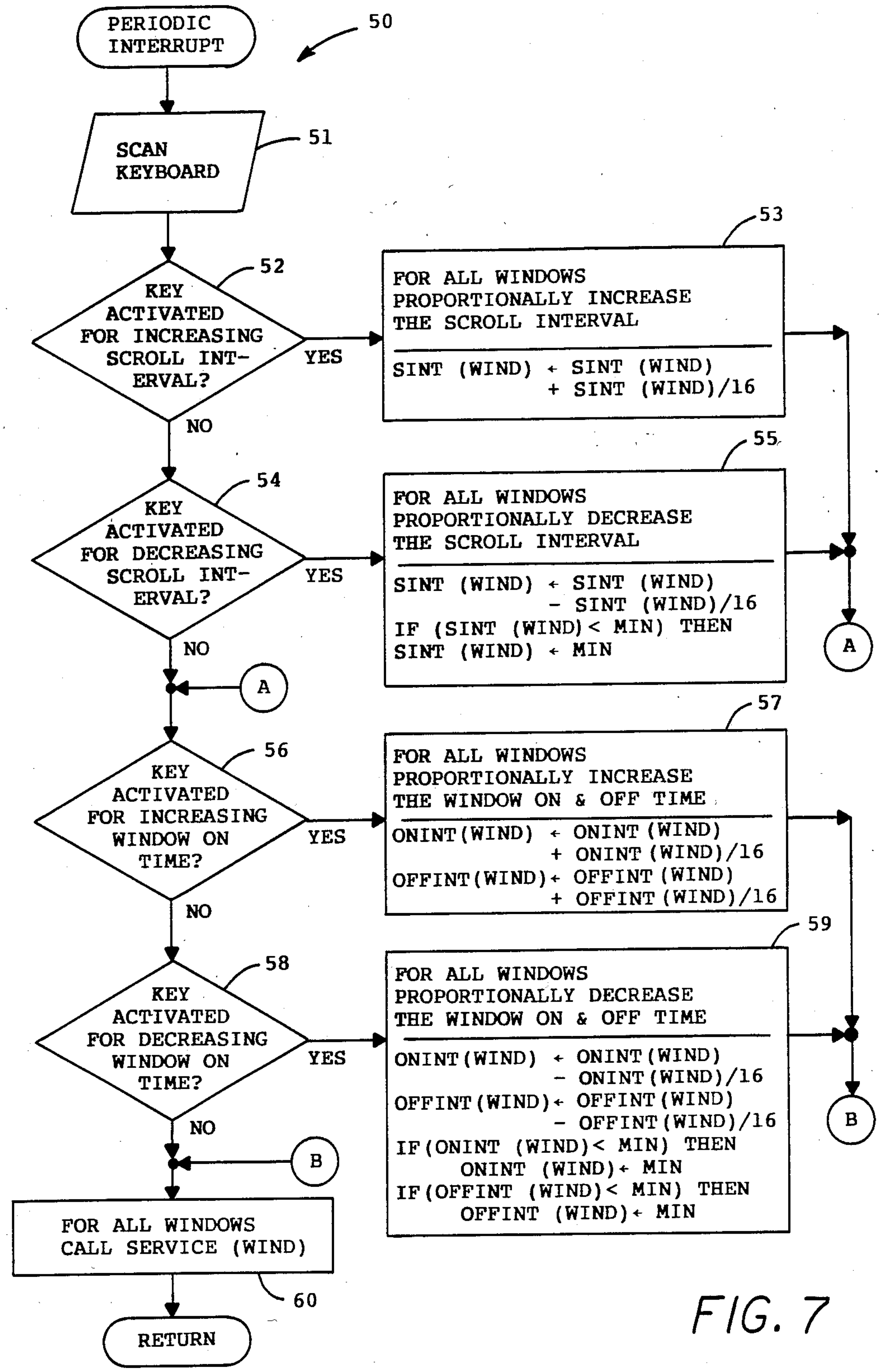
FIG. 7 is a flowchart of a periodic interrupt routine which repetitively changes the alphanumeric characters displayed in the windows on the video display of FIG. 1.

Since the windows are serviced by the interrupt procedure of FIG. 7, the interactive computer program executed in step 44 need not be concerned with the operation of the interrupt procedure. However, it may modify the contents of the registers 23 or the control parameter arrays 24, 25 (FIG. 1) to modify the operation of the periodic interrupt procedure without conflict or contention. Therefore, the details of the interactive computer program executed in step 44 are not relevant to a further understanding of the present invention, although examples have been described above for illustrating several applications of the present invention to specific fields of use.

Turning now to FIG. 7, there is shown a flowchart generally designated 50 of the periodic interrupt routine. In the first step 51, the keyboard (12 in FIG. 1) is scanned to receive predefined control commands which enable the user to modify certain timing information on an ongoing basis during the display of the windows. In step 52 execution branches depending on whether a preassigned key of the keyboard is activated for increasing the scroll interval (SINT). If this key is found to be activated, then in step 53, for all of the windows on the display, the scroll interval (SINT) is proportionally increased by a predetermined factor. As shown in step 53, the predetermined factor is 17/16. Similarly, in step 54 execution branches if a preassigned key is found to be activated for decreasing the scroll interval. If so, then in step 55 the scroll interval is proportionally decreased for all of the windows. This is done, for example, by multiplying the scroll interval (SINT) by a factor of 15/16. Because of rounding in the central processing unit, however, the value of the scroll interval should not be decreased so far as to cause rounding to a value of zero. Therefore, the value of the scrolling interval (SINT) is limited to a predetermined minimum value (MIN). For the factors of 17/16 and 15/16 shown, the minimum value should be at least 16 times the least significant bit value of the scrolling interval (SINT).

In step 56, execution branches if a preassigned key is found to be activated for increasing the window on time. If so, then in step 57 the window on and off times for all of the windows are proportionally increased. This is done, for example, by multiplying the window on time (ONINT) and the window off time (OFFINT) by a factor of 17/16. Similarly, in step 58 execution branches if a preassigned key is found to be activated for decreasing the window on time. If so, in step 59 the window on and off times for all of the windows are proportionally decreased. This is done, for example, by multiplying the window on and off times by a factor of 15/16, and limiting the times to a predetermined minimum value (MIN).

In a final step 60, a subroutine named SERVICE is called once for each of the windows. The subroutine SERVICE doe not require any user input since it transfers data from the registers to the video display following the instructions dictated by the window control parameter arrays and the register control parameter arrays. After each of the windows has been serviced, execution returns to the interrupted computer program.

Turning now to APPENDIX II, there is shown a listing of a low-level subroutine named DISWIND used in the procedure of servicing each window according to the control information stored in the register control parameter arrays and the window control arrays. Specifically, the subroutine DISWIND has parameters WIND, POINT, and NCHAR, and displays a selected number (NCHAR) of characters from RAM starting at a specified memory address (POINT). The first character at the RAM pointer is displayed in the upper left-hand corner of the window, which has a window character value of zero. Therefore, in step 140 the value of the window character pointer WCP for the current pointer window WIND is cleared. The arrow in step 140 indicates an assignment operation which is conventionally programmed by using an equals sign. Arrows are used in the computer listings instead of equal signs to distinguish assignment operation from the equality comparison which is also programmed as an equal sign.

Next an iterative loop is entered in step 160. In this step the value of the window character pointer WCP is compared to the number of characters NCHAR to be displayed, to determine whether all of the characters in the register have been displayed. Also, if the value for NCHAR is equal to zero, then the entire window will be filled with blanks. In step 170, the next character in the register is obtained at the memory address of POINT plus the value of window character pointer WCP. To transfer this character to the display and place it in the current window, the screen address CA must be computed for the window character pointer WCP. Following the procedure described above in connection FIG. 5, the character address CA is computed by first computing the length coordinate LC and width coordinate WC corresponding to the window character pointer WCP. These computations are performed in steps 210, 220 and 230. The character adrress CA is used in step 250 to transmit the character to the video display. This is done by calling a subroutine named DISPLAY which transmits the characte address along with the character code, the foreground and background colors for the window, and the pulsation and intensity for the window.

Next in step 270, the window character pointer WCP is incremented to find the next character. However, execution returns in step 290 if the window character pointer has exceeded a maximum value for the last character position, which is given by the product of the width W and length L for the window. Otherwise, the loop iterates by jumping back to step 160. Execution exits from this loop in step 160 when the window character pointer becomes equal to the number of characters (NCHAR). In this case, execution jumps to step 320 to fill the rest of the window with blanks. In step 320, the character is set equal to the ASCI code for a blank. Then in steps 350 to 370, the display address CA corresponding to the window character pointer is computed using the same formulas that were used in steps 210 to 230. Similarly, the blank characters are transmitted to the video display in step 400 in the same fashion as was previously done in step 250. Moreover, in step 410 the window character pointer is incremented and compared to the maximum value equal to the product of the width and length for the window. Execution returns once the entire window is filled with blanks, or loops back to step 320 to transmit another blank to the display.

Turning now to APPENDIX III, there is shown a listing of a subroutine named DISREG which calls the previously described subroutine DISWIND in order to display a selected register in a specified window starting at the value of the register character pointer RCP so long as the window and register are both active. In steps 530 and 540, execution returns if the window active flag WACT or the register active flag REGACT are not set. Otherwise, the number of characters in the register starting from the registered character pointer to the end of the register are computed. These characters are displayed in the window, up to the maximum number of characters which will fit in the window, by calling the subroutine DISWIND in step 590. Execution then returns in step 600.

Turning now to APPENDIX IV., there is shown a listing of a subroutine named LOAD for initially loading a window (WIND) with characters from a selected register (R). In the first step 720, a subroutine named CLOCK is called in order to obtain a number named TIME indicating the current time provided by the clock 21 in FIG. 1. In step 730 the control parameter TON is set equal to the time. Similarly, in step 740 the control parameter TSCR is set equal to the time. In step 750, the register character pointer (RCP) is set equal to the starting address (REGA) of the selected register. Then, in step 760, the subroutine DISREG of APPENDIX III is called to display the selected register starting at the beginning of the register. Finally, in step 770, the flag ONFLG is set equal to on to indicate that the window has been turned on, and execution returns in step 780.

Turning now to APPENDIX V, there is shown a listing of the subroutine named SERVICE which was called in step 60 of the periodic interrupt procedure 50 of FIG. 7. In the first step 930, the index R indicating the register currently being displayed in the window is obtained from the register list REGLIST for the window. Then in step 940 the current time is obtained by calling the CLOCK subroutine. The current iime is used in various ways to determine whether the window should change, depending upon the logical state of certain flags. If the flag ALLFLG is found to be set in step 970, then exeution branches to step 1190. Otherwise, in step 990 execution branches to step 1060 if the flag ONFLG is set. Otherwise, the window is in an off state and should not be turned on until a switching time TSW is reached. The switching time is computed in step 1000 as the sum of the time at which the window was turned off plus the window off interval OFFINT. Execution returns in step 1010 if the current time is less than the switching time. Otherwise, it is time to reload the window with characters from a new register. A new register is selected in step 1020 by calling a subroutine named NEWREG which is further described below in connection with APPENDIX VI. Then in step 1030, the index R of the new register is obtained from the register list REGLIST. The new register is loaded into the window in step 1040 by calling the subroutine LOAD previously described above in APPENDIX IV. After the register is loaded into the window, execution returns in step 1050.

If the window was found to be on in step 990, then step 1060 the time for switching is computed as the sum of the time TON that the window was last turned on, plus the window on interval ONINT, plus the extension interval EXTINT for the selected register. Then in step 1070 the current time is compared to the switching time to determine whether it is time to turn the window off. If not, execution jumps to step 1180 to check whether it is time to scroll the display. Otherwise, execution continues in step 1090 to set the window off in such a way that the entire window disappears from the display screen. This is done in steps 1090 to 1093 by saving the attributes of the window in temporary registers. Then in steps 1100 to 1103 the attributes of the window are replaced with the normal attributes for the display. In step 1110 the number of characters is set equal to zero, and in step 1120 the pointer is set equal to the starting address of the selected register so that in step 1130 the subroutine DISWIND can be called to load the entire window with blanks. These blanks have the same background color and other attributes as the display, so that the entire window disappears. In steps 1140 to 1143, the attributes of the window are restored from the temporary registers.

An alternative method of making the window disappear should be used when subliminal messages are to be briefly displayed in lieu of a current message from an interactive computer program. The message from the interactive computer program, for example, is stored in a register starting at a RAM address of CPDISP and includes an image of the entire display screen. In this case the window should be made to disappear by reloading the window with the corresponding portion of the image of the interactive message. This is done by replacing step 1130 by the statement:

```
CALL DISWIND(WIND, CPDISP+Z(WIND),
  L(WIND)*W(WIND))
```

Once the window is made to disappear, the window on flag (ONFLG) is set equal to zero in step 1150 to indicate that the window has been turned off. Then in step 1160 the off time TOFF is set equal to the current time. Then, execution returns to step 1170.

If in step 1070 it was not the time to clear the display, execution jumps to step 1180 to check whether the display should be scrolled. This is done by inspecting the scroll flag (SCRFLG) for the selected register, and execution returns if the scroll flag is cleared. Otherwise, in step 1190 the time to start scrolling (TSSR) is computed as the sum of the time at which the window was turned on (TON) plus the interval (STSC) before scrolling starts. To determine whether scrolling should be started, in step 1200 the current time is compared to the time to start scrolling. If the current time is less than the time to start scrolling, execution returns. Otherwise, in step 1210 the time for scrolling is computed as the sum of the time TSCR at which the window was last scrolled (or was first loaded) and the scrolling interval (SINT). In step 1220, execution returns if the current time is less than the time for scrolling. Scrolling is then performed unless the window would become empty. In step 1250, the control parameter TSCR is set equal to the current time. Then in step 1260, the RAM character pointer (RCP) is increased by the number of characters across the width of the window. Prior to scrolling, however, in step 1270 the RAM character pointer is compared to the last address of the register to determine whether the window would become empty if scrolled. If so, execution jumps back to step 1090 to set the window off so that the window disappears. Otherwise, in step 1280 the window is scrolled by calling the subroutine DISREG. Execution then returns in step 1290.

Turning now to APPENDIX VI, there is shown a listing of the subroutine named NEWREG for selecting a new register for display in a designated window. The selection is performed either randomly or sequentially, in response to the random flag (RDMFLG), and the selection is indicated by a new value for the register list pointer (REG) ranging from 1 to NREG. In step 1430, if the random flag is set then execution jumps to step 1480. Otherwise, the next register in the register list is selected by incrementing the register list pointer (REG) in step 1440. In step 1450, however, the register list pointer is compared to the number of registers in the list to determine whether the bottom of the list has been passed. If not, execution returns. Otherwise, in step 1460, the register list pointer is set equal to one and execution returns in step 1470.

To select a new register at random, in step 1480 a subroutine named RANDNUM is called to obtain a random number NUM. A selection pointer REM is computed as a corresponding random number between zero and two minus the number of registers in the list by performing an integer division of NUM by the number of registers minus one and computing the remainder. The integer division is performed in step 1490 and the remainder is computed step 1500. In step 1510, the register list pointer is incremented by one plus the remainder. In step 1520, the incremented value is compared to the number of the registers in the list to determine whether execution may return with a permissable register selection. Otherwise, in step 1530, the register list pointer is decremented by the number of registers to obtain a proper value, and in step 1540 execution returns. This completes the description of control procedure for servicing the widdows on the video display.

In view of the above, a computer-controlled video display terminal has been described which can be operated in a number of selected ways to facilitate the process of alphanumeric or graphic data transfer from the video display to the mind of a user. During the display of data, the user may increase or decrease the rate at which data are presented. The data are presented in at least one window having a position, size, and color chosen by the user to be most suitable for viewing. The data are flashed at a user selected rate to condition the user to accept data in a parallel mode, and over time the user will accept data presented in this fashion from a number of windows and presented at higher and higher rates. Subliminal messages can be presented repetitively but for brief intervals so as not to distract the conscious mind. The duration of the brief intervals is selected by the user to be just below the response time of his or her conscious perception. Messages are scrolled at a user selected rate so as to provide uninterrupted viewing of e amounts of data requiring mental concentration.

APPENDIX I. SAMPLE MESSAGES

```
[  We are very much what others    )
(  think of us.  The reception     )
(  our observations meet with      )
(  gives us courage to proceed,    )
(  or damps our efforts.           )
(                        Hazlitt   ]


[  The test of tolerance comes     )
(  when we are in a majority,      )
(  the test of courage comes       )
(  when we are in a minority.      )
(                                  )
(          Ralph W. Sockman, D.D.  ]


[  As the essence of               )
(  courage is to stake one's       )
(  life on a possibility,          )
(  so the essence of faith         )
(  is to believe that the          )
(  possibility exists.             )
(                 William Slater   ]


[  It takes vision and             )
(  courage to create -             )
(  it takes faith and              )
(  courage to prove.               )
(                                  )
(                Owen D. Young     ]
```

```
        SUBROUTINE DISWIND(WIND, POINT, NCHAR)
/*      DISPLAY NCHAR FROM RAM STARTING AT                         */
/*        POINT. FILL THE REST OF THE WINDOW                       */
/*        WITH BLANKS                                              */
        WCP(WIND) ← 0
/*      TEST WHETHER ALL OF THE REGISTER HAS BEEN DISPLAYED*/
        TEST      IF(WCP(WIND) > NCHAR) THEN GO TO BLANK
/*      GET THE NEXT CHARACTER FROM MEMORY
                  CHAR ← MEM(POINT + WCP(WIND))
/*      COMPUTE THE DISPLAY ADDRESS CORRESONDING TO THE           */
/*        WINDOW POINTER                                           */
               LC ← INT(WCP(WIND)/W(WIND))
               WC ← WCP(WIND) - W(WIND)*LC
               CA ← Z(WIND) + WC + N*LC
/*      TRANSMIT THE CHARACTER TO THE VIDEO DISPLAY                */
               CALL DISPLAY(CHAR, CA, FC(WIND), BC(WIND)
                                PULSE(WIND), INTEN(WIND))
/*      FIND THE NEXT CHARACTER                                    */
                    WCP(WIND) ← WCP(WIND) + 1
/*      RETURN AT THE END OF THE WINDOW                            */
               IF (WCP(WIND) > W(WIND)*L(WIND)) THEN RETURN
               GO TO TEST
/*      FILL THE REST OF THE WINDOW WITH BLANKS                    */
        BLANK  CHAR ← ASCI(" ")
/*      COMPUTE THE DISPLAY ADDRESS CORRESPONDING TO THE           */
/*        WINDOW POINTER                                           */
               LC ← INT(WCP(WIND)/W(WIND))
               WC ← WCP(WIND) - W(WIND)*LC
               CA ← Z(WIND) + WC + N*LC
/*      TRANSMIT THE BLANK CHARACTER TO THE VIDEO                  */
/*        DISPLAY                                                  */
               CALL DISPLAY (CHAR, CA, FC(WIND), BC(WIND),
                                 PULSE(WIND), INTEN(WIND))
               WCP(WIND) ← WCP(WIND) + 1
               IF (WCP(WIND) > W(WIND)*L(WIND)) THEN RETURN
               GO TO BLANK
```

APPENDIX III.

```
        SUBROUTINE DISREG(R, WIND)
/*      DISPLAY REGISTER (R) IN WINDOW (WIND) STARTING             */
```

```
/*      AT RCP(WIND) IF WINDOW AND REGISTER ARE ACTIVE      */
                IF (WACT(WIND <> 1) THEN RETURN
                IF (REGACT(R) <> 1) THEN RETURN
/*    COMPUTE THE NUMBER OF CHARACTERS                      */
/*      IN R FROM RCP TO THE END OF R                       */
                NCHAR ← REGA(R) + NCREG(R) - RCP(WIND)
/*    DISPLAY THE CHARACTERS                                */
                CALL DISWIND(WIND, RCP(WIND), NCHAR)
                RETURN
```

APPENDIX IV

```
      SUBROUTINE LOAD(R, WIND)
/*    LOAD WINDOW AT START OF DISPLAY INTERVAL              */
                CALL CLOCK(TIME)
                TON(WIND) ← TIME
                TSCR(WIND) ← TIME
                RCP(WIND) ← REGA(R)
                CALL DISREG(R, WIND)
                ONFLG(WIND) ← 1
                RETURN
```

APPENDIX V

```
      SUBROUTINE SERVICE(WIND)
/*    SERVICE WINDOW IF IT IS TIME TO CHANGE                */
/*      THE DISPLAY                                         */
                R ← REGLIST(REG(WIND), WIND)                */
                CALL CLOCK(TIME)
/*    SERVICE AT END OF ONINT OR OFFINT UNLESS              */
/*      ALLFLG IS SET                                       */
                IF(ALLFLG(R) = 1) THEN GO TO ALFLG
/*    BRANCH TO DETERMINE SWITCHING TIME                    */
                IF(ONFLG(WIND) = 1) THEN GO TO WINDON
      WINDOFF   TSW ← OFF(WIND) + OFFINT(WIND)
                IF(TIME < TSW) THEN RETURN
      RELOAD    CALL NEWREG
                R ← REGLIST(REG(WIND), WIND)
                CALL LOAD(R, WIND)
```

```
                     RETURN
        WINDON       TSW ← TON(WIND) + ONINT(WIND) + EXTINT(R)
                     IF (TIME < TSW) THEN GO TO SCRCHK                */
  /*    SET WINDOW OFF SO WINDOW DISAPPEARS                           */
        CLEAR        SAVEBC ← BC(WIND)
                     SAVEFC ← FC(WIND)
                     SAVEPU ← PULSE(WIND)
                     SAVEIN ← INTEN(WIND)
                     BC(WIND) ← BCDISP
                     FC(WIND) ← FCDISP
                     PULSE(WIND) ← PUDISP
                     INTEN(WIND) ← INDISP
                     NCHAR ←O
                     POINT ←REGADR(R)
                     CALL DISWIND(WIND, POINT, NCHAR)
                     BC(WIND) ← SAVEBC
                     FC(WIND) ← SAVEFC
                     PULSE(WIND) ← SAVEPU
                     INTEN(WIND) ← SAVEIN
                     ONFLG(WIND) ← O
                     TOFF(WIND) ← TIME
                     RETURN
        SCRCHK       IF (SCRFLG(R) >< 1) THEN RETURN
        ALFLG        TSSR ← TON(WIND) + STSC(WIND)
                     IF (TIME < TSSR) THEN RETURN
                     TTSC ← TSCR(WIND) + SINT(WIND)
                     IF (TIME < TTSC) THEN RETURN
  /*    SCROLL R INTO WINDOW UNTIL                                    */
  /*      WINDOW WOULD BECOME EMPTY                                   */
        SCROLL       TSCR(WIND) ← TIME
                     RCP(WIND) ← RCP(WIND) + W(WIND)
                     IF (RCP(WIND) > REGA(R) + NCREG(R))
                          THEN GO TO CLEAR
                     CALL DISREG(R, WIND)
                     RETURN
```

APPENDIX VI

```
        SUBROUTINE NEWREG(WIND)
  /*    SELECT NEXT REGISTER FOR DISPLAY IN WIND                      */
```

```
/*  TEST FOR RANDOM OR SEQUENTIAL                              */
                  IF (RDMFLG(WIND) = 1) THEN GO TO RAND
    SEQUEN        REG(WIND) <—— REG(WIND) + 1
                  IF (REG(WIND) <= NREG(WIND)) THEN RETURN
                  REG(WIND) <—— 1
                  RETURN
    RAND          CALL RANDNUM(NUM)
                  Q <—— INT(NUM/(NREG(WIND) - 1))
                  REM <—— NUM - Q*(NREG(WIND) - 1)
                  REG(WIND) <—— REG(WIND) + REM + 1
                  IF (REG(WIND) <= NREG(WIND)) THEN RETURN
                  REG(WIND) <—— REG(WIND) - NREG(WIND)
                  RETURN
```

What is claimed:

1. A method of operating a computer-controlled video display terminal of the kind having a central processing unit, a memory, a video display screen and means for displaying selected data at selected coordinates on said screen, said central processing unit executing a control procedure stored in said memory for selecting said data and said coordinates; said memory including a set of registers storing codes for said data, and memory locations storing a set of control parameters defining (a) respective window regions on said display screen (b) a subset of said registers for display in each of said windows and (c) timing information for controlling how long the same data are displayed in each window; said method comprising the steps of said central processing unit executing said control procedure to select said data and coordinates by the steps of:

(1) readigg said control parameters defining said subset of said registers for display in each of said windows;

(2) selecting a particular register in said subset of said registers for each of said windows;

(3) reading said control parameters defining said respective window regions on said display screen for each of said windows;

(4) in response to said control parameters defining said respective window regions read in step (3) above, transferring at least some of the codes for data stored in the particular register selected in step (2) for each window to said means for displaying so that characters are selectively displayed at each fo said window regions corresponding to said codes transferred from the respective selected registers;

(5) reading said timing information; and (6) using said timing information in combination with said control parameters defining said particular register selected in step (2) and said control parameters defining said respective window regions read in step (3), to selectively terminate the display of said data selectively displayed at each of said window regions;

wherein said steps are repetitively performed.

2. The method as claimed in claim 1, wherein said timing information includes the duration of the interval for which the same data are displayed in each window and the duration of an interval in which no data are displayed in each window.

3. The method as claimed in claim 2, wherein said display terminal further comprises a keyboard for entry of data by a user viewing said display screen, and wherein the duration of the interval from which the same data are displayed is adjusted by changing said timing information in response to data entered on said keyboard by said user.

4. The method as claimed in claim 1, wherein said display terminal further comprises a keyboard for entry of data by a user viewing said display screen, and wherein said step (4) of transferring includes successively transferring different portions of the codes in at least one register for certain ones of the windows so as to provide scrolling of the data displayed in at least one of the windows; said timing information includes the duration of the interval between said successive transfers of said different portions so as to control the rate of said scrolling; and said duration of the interval between said successive transfers is adjusted by changing said timing information in response to data entered on said keyboard by said user.

5. The method as claimed in claim 1, wherein said control parameters defining said window regions include parameters defining the size of each window region and its position on said display.

6. The method as claimed in claim 1, wherein said means for displaying includes means for displaying data in selected colors and said control parameters defining said window regions include parameters defining the foreground color of the data displayed in each window, and the background color of each window around the data displayed therein.

7. The method as claimed in claim 6, wherein said control parameters defining said window regions include a respective flag for selectively inhibiting the display of each window.

8. The method as claimed in claim 1, wherein said means for displaying includes means for displaying data using a selected pulsation and intensity and said control parameters defining said window regions include parameters for controlling the pulsation and intensity with which the data are displayed in each window.

9. The method as claimed in claim 1, wherein said memory further includes locations storing respective timing control parameters for each register which is read in step (5) and is used in step (6) along with the timing information (c) for each window to selectively terminate the display of said data.

10. The method as claimed in claim 1, wherein said control parameters (b) defining said set of registers for display in each of said windows includes an ordered list of registers and said step (2) of selecting a particular register selects the next register in said ordered list.

11. The method as claimed in claim 1, wherein said step (2) of selecting a particular register selects a new register at random from said subset of said registers.

12. The method as claimed in claim 1, wherein said step (2) of selecting a particular register selects a first one of said registers for display in a first one of said windows in response to the contents of a second one of said registers selected for display in a second one of said windows.

13. The method as claimed in claim 1, wherein said display terminal includes a keyboard for entry of data from a user viewing said screen, and said step (2) of selecting a particular register selects said register in response to data entered by said user from said keyboard.

14. The method as claimed in claim 13, wherein said data entered by said user is used as a key to select a particular register having contents corresponding to said key.

15. The method as claimed in claim 1, wherein said steps (1) to (6) are repetitively performed in response to a repetitive interrupt of said central processing unit.

16. The method as claimed in claim 1, wherein said display terminal includes a keyboard for entry of data from a user viewing said screen, and said steps (1) to (6) are repetitively performed when said user is waiting for data to be displayed on said video display in response to a service request entered from said keyboard.

17. A method of operating a computer-controlled video display terminal of the kind having a central processing unit, a memory, a video display screen and means for displaying lines of selected characters at selected locations on said screen, and means for entry of data from a user viewing said screen to said central processing unit, said central processing unit executing a control procedure stored in said memory for selecting said characters; said memory including a register storing codes for characters and at least one location storing a timing control parameter related to the size of said register storing codes for characters; said method comprising the steps of said central processing unit executing said control procedure to read said memory location to obtain said timing control parameter, successively transfer at least some of the codes from said buffer to said means for displaying so as to display lines of characters corresponding to said codes and so as to successively scroll said lines of characters at a predetermined rate, and to change the value of said timing control parameter in response to data entered by said user via said means for entry of data so that said user may variably select said scrolling rate while viewing said lines of characters on said display.

18. The method as claimed in claim 17 wherein said means for entry of data includes means for entering a first command for increasing the scrolling rate and means for entering a second command for decreasing the scrolling rate.

19. During the operation of a computer-controlled video display terminal by a user to interactively run a computer program, a method of displaying from time-to-time auxiliary messages to the user; said computer-controlled video display terminal including a video display screen, means for displaying selected characters at selected coordinates on said screen, means including a keyboard for entering commands from said user while viewing said display screen to interactively run said computer program, a central processing unit, and a memory; said memory including a set of registers storing codes for characters, and memory locations for storing a set of control parameters defining at least one window region of said display screen for the display of said auxiliary messages and timing information for controlling the intervals during which said auxiliary message are displayed in said window region; said method comprising the steps of said central processinguunit executing said control procedure to display from time-to-time said auxiliary messages in said window region by the steps of:

(1) selecting a particular one of said registers;
(2) reading said control parameters defining said window region on said display screen;
(3) in response to said control parameters defining said respective window region read in step (2) above, transferring at least some of the codes for characters stored in the register selected in step (1) to said means for displaying so that characters are selectively displayed at said window region corresponding to said codes transferred from the selected register;
(4) reading said timing information; and
(5) in response to said timing information, selectively terminating the display of said characters selectively displayed in the window region;

wherein said steps are repetitively performed to select different ones of the registers and thereby display different corresponding messages, and wherein said central processing unit executes said control procedure to modify said timing information stored in said memory in response to commands received from said user via said means for entering to thereby modify the intervals during which said messages are displayed.

20. The method as claimed in claim 19, wherein register selection commands are received from said user via said means for entering, and wherein a particular register is selected in step (1) in response to said register selection commands.

21. The method as claimed in claim 19, wherein window position commands are received from said user via said means for entering for adjusting said control parameters defining said window region.

22. The method as claimed in claim 19, wherein said means for displaying includes means for displaying characters of selected colors, and said control parameters defining said window region include parameters defining the foreground color of the characters displayed in the window and the background color of the window around the characters displaye therein, and wherein said control procedure is executed to display a plurality of colors to said user and to receive from said user via said means for entering an indication of a selected foreground color and background color, and to use said indication for adjusting said parameters defining the foreground color and background color.

23. The method as claimed in claim 19, wherein said steps (1) to (5) are performed in response to a repetitive interrupt of said central processing unit.

24. The method as claimed in claim 19, wherein said steps (1) to (5) are repetitively performed when said user is waiting for said computer program being interactively run to respond to commands entered by said user from said keyboard.

25. During the operation of a computer-controlled video display terminal by a user to interactively run a computer program, a method of displaying from time-to-time auxiliary messages to the user; said computer-controlled video display terminal including a video display screen, means for displaying selected characters at selected coordinates on said screen, means including a keyboard for entering commands from said user while viewing said display screen to interactively run said computer program, a central processing unit, and a memory; said memory including a set of registers storing codes for characters, and memory locations for storing a set of control parameters defining at least one window region of said display screen for the display of said auxiliary messages and timing information for controlling the intervals during which said auxiliary message are displayed in said window region; said method comprising the steps of said central processing unit executing said control procedure to display from time-to-time said auxiliary messages in said window region by the steps of:

(1) selecting a particular one of said registers;

(2) reading said control parameters defining said window region on said display screen;

(3) in response to said control parameters defining said respective window region read in step (2) above, transferring at least some of the codes for characters stored in the register selected in step (1) to said means for displaying so that characters are selectively displayed at said window region corresponding to said codes transferred from the selected register;

(4) reading said timing information; and (5) in response to said timing information, selectively terminating the display of said characters selectively displayed in the window region;

wherein said steps are repetitively performed to select different ones of the registers and thereby display different corresponding messages, said central processing unit executes said control procedure to modify said timing information stored in said memory in response to commands received from said user via said means for entering to thereby modify the intervals during which said messages are displayed, register selection commands are received from said user via said means for entering, and a particular register is selected in step (1) in response to said register selection commands, window position commands are received from said user via said means for entering for adjusting said control parameters defining said window region, and said means for displaying includes means for displaying characters of selected colors, and said control parameters defining said window region include parameters defining the foreground color of the characters displayed in the window and the background color of the window around the characters displayed therein, and wherein said control procedure is executable to display a plurality of colors to said user and to receive from said user via said means for entering an indication of a selected foreground color and background color, and to use said indication for adjusting said parameters defining the foreground color and background color.

26. The method as claimed in claim 25, wherein said steps (1) to (5) are performed in response to a repetitve interrupt of said central processing unit.

27. The method as claimed in claim 25, wherein said steps (1) to (5) are repetitively performed when said user is waiting for said computer program being interactively run to respond to commands entered by said user from said keyboard.

28. A computer-controlled video display terminal of the kind having a central processing unit, a memory, a video display screen and means for displaying selected characters at selected coordinates on said screen, said central processing unit providing means for executing a control procedure stored in said memory for selecting said characters and said coordinates; said memory inlcuding a set of registers storing codes for characters, and memory locations storing a set of control parameters defining (a) respective window regions on said display screen (b) a subset of said registers for display in each of said windows and (c) timing information for controlling how long the same characters are displayed in each window; and said control procedure including instructions for selecting said characters and coordinates by the steps of:

(1) reading said control parameters defining said subset of said registers for display in each of said windows;

(2) selecting a particular register in said subset of said registers for each of said windows;

(3) reading said control parameters defining said respective window regions on said display screen for each of said windows;

(4) in response to said control parameters defining said respective window regions read in step (3) above, transferring at least some of the codes for character stored in the particular register selected in step (2) for each window to said means for displaying so that characters are selectively displayed at each of said window regions corresponding to said codes transferred from the respective selected registers;

(5) reading said timing information;

(6) using said timing information in combination with said control parameters defining said particular register selected in step (2) and said control parameters defining said respective window regions read in step (3) to selectively terminate the display of said characters selectively displayed at each of said window regions; and (7) repeating steps (1) to (6) above.

29. The apparatus as claimed in claim 28, wherein said timing information includes the duration of the interval for which the same characters are displayed in each window and the duration of an interval in which no characters are displayed in each window.

30. The apparatus as claimed in claim 29, wherein said display terminal further comprises a keyboard for entry of data by a user viewing said display screen, and wherein the control porcedure includes executable instructions for adjusting the duration of the interval from which the same characters are displayed by changing said timing information in response to data entered on said keyboard by said user.

31. The apparatus as claimed in claim 28, wherein said display terminal further comprises a keyboard for entry of data by a user viewing said display screen, and wherein said step (4) of transferring includes successively transferring different portions of the codes in at least one register for certain ones of the windows so as to pro ide scrolling of the characters displayed in at least one of the windows; said timing information includes the duration of the interval between said successive transfers of said different portions so as to control the rate of said scrolling; and said control procedure includes executable instructions for adjusting the duration of the interval between said successive transfers by changing said timing information in response to data entered on said keyboard by said user.

32. The apparatus as claimed in claim 28, wherein said control parameters defining said window regions include parameters defining the size of each window region and its position on said display.

33. The apparatus as claimed in claim 28, wherein said means for displaying includes means for displaying characters of selected colors and said control parameters defining said window regions include parameters defining the foreground color of the characters displayed in each window, and the background color of each window around the characters displayed therein.

34. The apparatus as claimed in claim 33, wherein said control parameters defining said window regions include a respective flag for selectively inhibiting the display of each window.

35. The apparatus as claimed in claim 28, wherein said means for displaying includes means for displaying characters of selected pulsation and intensity and said control parameters defining said window regions include parameters for controlling the pulsation and intensity of the characters displayed in each window.

36. The apparatus as claimed in claim 28, wherein said memory further includes locations storing respective timing control parameters for each register which is read in step (5) and is used in step (6) along with the timing information (c) for each window to selectively terminate the display of said characters.

37. The apparatus as claimed in claim 28, wherein said cottrol parameters (b) defining said set of registers for display in each of said windows includes an ordered list of registers and said step (2) of selecting a particular register selects the next register in said ordered list.

38. The apparatus as claimed in claim 28, wherein said step (2) of selecting a particular register selects a new register at random from said subset of said registers.

39. The apparatus as claimed in claim 28, wherein said step (2) of selecting a particular register selects a first one of said registers for display in a first one of said windows in response to the contents of a second one of said registers selected for display in a second one of said windows.

40. The apparatus as claimed in claim 28, wherein said display terminal includes a keyboard for entry of data from a user viewing said screen, and said step (2) of selecting a particular register selects said register in response to data entered by said user from said keyboard.

41. The apparatus as claimed in claim 40, wherein said data entered by said user is used as a key to select a particular register having contents corresponding to said key.

42. The apparatus as claimed in claim 28, wherein said steps (1) to (6) are repetitively performed in response to a repetitive interrupt of said central processing unit.

43. The apparatus as claimed in claim 28, wherein said display terminal includes a keyboard for entry of data from a user viewing said screen, and said steps (1) to (6) are repetitively performed when said user is waiting for data to be displayed on said video display in response to a service request entered from said keyboard.

44. A computer-controlled video display terminal of the kind having a central processing unit, a memory, a video display screen and means for displaying lines of selected characters at selected locations on said screen, means for entry of data from a user viewing said screen to said central processing unit, and a control procedure stored in said memory and executable by said central processing unit for selecting said characters; said memory including a register storing codes for characters and at least one location storing a timing control parameter related to the size of said register storing codes for characters; said control procedure including executable instructions for reading said memory location to obtain said timing control parameter, successively transferring at least some of the codes from said buffer to said means for displaying so as to display lines of characters corresponding to said codes and so as to successively scroll said lines of characters at a predetermined rate, and for changing the value of said timing control parameter in response to data entered by said user via said means for entry of data so that said user may variably select said scrolling rate while viewing said lines of characters on said display.

45. The apparatus as claimed in claim 44 wherein said means for entry of data includes means for entering a first command for increasing the scrolling rate and means for entering a second command for decreasing the scrolling rate.

* * * * *